United States Patent [19]

Koishi et al.

[11] Patent Number: 5,043,390

[45] Date of Patent: Aug. 27, 1991

[54] FLUOROOLEFIN-ALKENE BASE COPOLYMER USEFUL AS PAINT VEHICLE

[75] Inventors: Toshio Koishi, Sakado; Yutaka Maruyama, Kamifukuoka; Mikio Ootani, Kawagoe; Seichi Katsuragawa, Tokorozawa; Kentaro Tsutsumi; Kiyomi Sugawara, both of Kawagoe, all of Japan

[73] Assignee: Central Glass Company, Limited, Ube, Japan

[21] Appl. No.: 503,921

[22] Filed: Apr. 4, 1990

[30] Foreign Application Priority Data

Apr. 5, 1989 [JP] Japan ................................. 1-86595
Aug. 11, 1989 [JP] Japan ................................. 1-208618

[51] Int. Cl.$^5$ ............................................. C08L 27/12
[52] U.S. Cl. ................................. 525/200; 526/249; 526/250; 526/254; 526/255
[58] Field of Search ............... 526/255, 249, 250, 254; 525/200

[56] References Cited

U.S. PATENT DOCUMENTS 2,753,328  7/1956  Barnhart .
4,631,326  12/1986  Koishi et al. .
4,954,589  9/1990  Sugawara et al. .

FOREIGN PATENT DOCUMENTS 58-136605  8/1983  Japan .
59-219372  12/1984  Japan .
63-283929  11/1988  Japan .
1-60616    3/1989   Japan .
949422     2/1964   United Kingdom .
2218707   11/1989   United Kingdom .

OTHER PUBLICATIONS

Hackh's Chemical Dictionary—Fourth Edition, p. 712.

Primary Examiner—Joseph L. Schofer
Assistant Examiner—N. Sarofim
Attorney, Agent, or Firm—Fleit, Jacobson, Cohn, Price, Holman & Stern

[57] ABSTRACT

The invention provides a novel copolymer comprising 25-75 mol % of a fluoroolefin such as CTFE or TFE, 10-70 mol % of an alkene such as ethylene or propylene, 3-40 mol % of a hydroxyl-containing allyl ether such as ethylene glycol monoallyl ether and 0-20 mol % of a carboxyl-containing monomer such as vinylacetic acid. This copolymer possesses favorable properties characteristic of fluororesins, is soluble in organic solvents including aromatic solvents low in polarity, such as xylene, and is curable at relatively low temperatures. The copolymer is useful particularly as a paint vehicle. The water repellency of the copolymer in cured state can be enhanced by incorporating a fluorine-containing surface modifier in the copolymer.

9 Claims, No Drawings

FLUOROOLEFIN-ALKENE BASE COPOLYMER USEFUL AS PAINT VEHICLE

BACKGROUND OF THE INVENTION

This invention relates to a fluoroolefin-alkene base copolymer which is soluble in various organic, solvents, curable at relatively low temperatures and useful as a paint vehicle.

Fluororesins are generally excellent in weather resistance, heat resistance and chemical resistance. Accordingly paints using a fluororesin as the vehicle have been developed for applications to chemical plants, vehicles, buildings and other constructions, machinery and food containers. Recently much attention has been directed to solvent-thinned paints using a fluororesin which is soluble in organic solvents and curable at relatively low temperatures.

It is well known that copolymerization of a fluoroolefin such as chlorotrifluoroethylene or tetrafluoroetylene with an alkene such as ethylene, propylene or butylene gives an alternating copolymer which is high in crystallinity and transparency, relatively high in the content of fluorine and excellent in heat resistance, chemical resistance and weather resistance. For example, British Pat. No. 949,422 and U.S. Pat. No. 2,753,328 show such copolymers.

To use a fluoroolefin-alkene copolymer as the vehicle of a recoatable paint it is necessary to use at least one other comonomer for rendering the copolymer soluble in organic solvents and for introducing a functional group into the copolymer.

JP-A 59-219372 proposes to copolymerize a hydroxyalkylvinyl ether with a fluoroolefin and an alkene to obtain copolymers which have hydroxyl group and hence can be cured with a known curing agent such as a polyisocyanate or a modified melamine resin. However, when a hydroxyalkylvinyl ether is used there is some problem about compatibility of the copolymer with popular curing agents. Moreover, in the case of using a hydroxyalkylvinyl ether it is not easy to prepare a desired copolymer by radical polymerization, and in the presence of proton the alkylvinyl ether is liable to hydrolize into acetaldehyde and alcohol. It is often that during the copolymerization reaction system the reaction liquid containing a copolymerized product gels as the pH of the reaction liquid lowers. To prevent lowering of the pH it is necessary to perform the copolymerization in the presence of a considerable amount of an acid acceptor, but the existence of even a very small amount of the acid acceptor in the product causes clouding of the copolymer solution and insufficient gloss of a coating film formed by application of the copolymer solution.

Often it is desired to introduce a polar group such as carboxyl group, besides hydroxyl group for curing, into a fluoroolefin base copolymer for use as a paint vehicle for the purpose of improving dispersibilities of pigments in solutions of the copolymer. However, in the case of using a hydroxyalkylvinyl ether it is difficult to simultaneously copolymerize the monomers including a carboxyl-containing monomer to a sufficient degree of polymerization and at good yield since the alkylvinyl ether is liable to decompose or react with the carboxyl-containing monomer. It is necessary to first prepare a copolymer not having carboxyl group and then reacting the copolymer with a carboxyl-containing monomer. For example, JP-A 58-136605 proposes first preparing a copolymer of a fluoroolefin and a hydroxyalkylvinyl ether and then reacting the copolymer with succinic anhydride. From a practical point of view, such a two-stage process is inconvenient and raises some problems including a tendency to coloring of the finally obtained copolymer.

SUMMARY OF THE INVENTION

It is an object of the present invention to provide a fluoroolefin-alkene base copolymer which has hydroxyl group optionally together with carboxyl group, can be prepared by a single-stage radical polymerization reaction and is soluble in organic solvents including aromatic solvents low in polarity and hence practicable as a paint vehicle.

The present invention provides a copolymer comprising 25–75 mol % of first repeating units which originate from a fluoroolefin, 10–70 mol % of second repeating units which originate from an alkene, 3–40 mol % of third repeating units which originate from a hydroxyl-containing allyl ether represented by the general formula $CH_2=CHCH_2O+CH_2CRHO\rightarrow_n H$, wherein R is H or $CH_3$ and n is 0 or an integer from 1 to 6, and 0–20 mol % of fourth repeating units which originate from a carboxyl-containing monomer.

The primary feature of the invention is using a hydroxyl-containing allyl ether of the above general formula to introduce hydroxyl group into a fluoroolefinalkene copolymer. By using a hydroxyl-containing allyl ether a desired copolymer can easily be prepared by a radical polymerization reaction without using any acid acceptor, and the obtained copolymer is good in compatibility with many kinds of polyisocyanates and modified melamine resins useful as curing agents. Even in the case of a copolymer incorporating a carboxyl-containing monomer for improving dispersibilities of pigments the copolymer can be prepared by a single-stage copolymerization reaction. The molecule of a hydroxyl-containing allyl ether has allyl linkage which is susceptible to chain transfer. Therefore, without using any chain transfer agent a copolymer according to the invention can be prepared with a relatively low molecular weight which is favorable for solubilities of the copolymer in various solvents.

To enhance water repellency of a copolymer according to the invention in cured state it is optional to incorporate a fluorine-containing surface modifier in the copolymer by performing the copolymerization reaction in the presence of the surface modifier. The copolymer with enhanced water repellency will be used in paints for exterior walls of buildings and topcoat paints for automobiles.

Also optionally, a copolymer according to the invention may further comprise not more than 10 mol % of repeating units which originate from a monomer or monomers different from the above describe monomers.

A copolymer according to the invvntion is excellent in chemical resistance and weather resistance and high in transparency. This copolymer exhibits high solubilities in various organic solvents including aromatic solvents which are low in polarity and suitable for use in paints, and the copolymer can easily be cured by an ordinary curing agent such as a polyisocyanate or a modified melamine resin. A solution of this copolymer in an organic solvent is useful as a coating liquid composition, and a paint composition is obtained by dispersing a pigment in the solution.

DESCRIPTION OF THE PREFERRED EMBODIMENTS

Good examples of fluoroolefins useful in this invention are trifluoroethylene, tetrafluoroethylene, chlorotrifluoroethylene, hexafluoropropene, vinyl fluoride and vinylidene fluoride. Considering polymerizing reactivities of monomers and the properties of the obtained copolymers, it is preferred to use chlorotrifluoroethylene or tetrafluoroethylene.

Good examples of alkenes useful in this invention are ethylene, propylene, n-butene, iso-butene, n-hexene, iso-octene, 1-octene and vinylcyclohexene. Considering the copolymerizability and the properties of the obtained copolymers, it is preferred to make a selection from ethylene, propylene, n-butene and iso-butene. If desired two or more kinds of alkenes can be used jointly.

The third component of the copolymer is selected from hydroxyl-containing allyl ethers represented by the general formula $CH_2=CHCH_2O(CH_2CRHO)_nH$, wherein R is H or $CH_3$ and n is 0 or an integer from 1 to 6. Examples of such allyl ethers are allyl alcohol, ethylene glycol monoallyl ether, diethylene glycol monoallyl ether, triethylene glycol monoallyl ether and hydroxypropylallyl ether. It is preferred to use an allyl ether for which n in the above formula is 0 or from 1 to 4.

It is optional and rather preferable to incorporate a carboxy-containing monomer in a copolymer according to the invention. Examples of carboxyl-containing monomers useful in this invention are acrylic acid, methacrylic acid, vinylacetic acid, allylacetic acid, allyloxyacetic acid and itaconic acid, and it is preferred to use vinylacetic acid, allyloxyacetic acid or acrylic acid.

It is also optional to incorporate a monomer or monomers not having carboxyl group into a copolymer according to the invention on condition that the optional monomer(s) does not occupy more than 10 mol % of the copolymer. For example, an optional comonomer can be chosed from hydroxyl-containing vinyl ethers such as hydroxyethylvinyl ether, hydroxypropylvinyl ether and hydroxybutylvinyl ether, acrylates such as hydroxyethyl acrylate, methyl methacrylate and glycidyl methacrylate, acrylic amides such as acrylamide and N-methylol acrylamide and vinyl ethers such as ethylvinyl ether and butylvinyl ether.

The amounts of the essential and optional components of a copolymer according to the invention are limited within the ranges specified hereinbefore, respectively, in view of the following tendencies.

If the amount of a fluoroolefin is too large the copolymer becomes low in solubilities in organic solvents and, besides, it becomes difficult to prepare the copolymer at good yield. If the amount of the fluoroolefin is too small the copolymer becomes insufficient in chemical resistance and weather resistance. It is preferred that in the copolymer repeating units originating from a fluoroolefin amount to 30-60 mol %.

If the amount of an alkene is too small it is difficult to prepare the copolymer at good yield. If the amount of the alkene is too large the copolymer becomes insufficient in chemical resistance and weather resistance. It is preferred that the repeating units originating from an alkene amount to 20-50 mol %.

If the amount of a hydroxyl-containing allyl ether is too small the copolymer becomes low in solubilities in organic solvents and weak in susceptibility to curing reaction and, hence, becomes insufficient in chemical resistance and weather resistance, and a paint composition using the copolymer becomes poor in recoatability. If the amount of this component is too large the copolymer will become too low in molecular weight, and some difficulties will arise in preparing the copolymer. It is preferred that the hydroxyl-containing allyl ether component amounts to 5-30 mol %.

If the amount of a carboxyl-containing monomer is too large the copolymer is liable to become too low in molecular weight and relatively low in solubilities in organic solvents, and it is difficult to prepare the copolymer at good yield. It is preferred that the amount of this component is not more 10 mol %.

If the copolymer contains more than 10 mol % of an optional component other than a carboxyl-containing component the copolymer may be insufficient in solubilities or transparency, and some difficulties will arise in preparing the copolymer. It is preferred that the amount of repeating units originating from the otional monomer(s) is not more than 8 mol %.

It is desirable to adjust the composition of a copolymer according to the invention such that the intrinsic viscosity of the copolymer in tetrahydrofuran at 30° C. falls in the range from 0.05-2.0 dl/g. When the intrinsic viscosity is too high the copolymer may not be desirably high in solubilities in various organic solvents. When the intrinsic viscosity too low paint compositions using a solution of the copolymer may not be satisfactory in applicability and may not provide paint films of good properties.

In the case of incorporating a fluorine-containing surface modifier in a copolymer according to the invention for enhancing the water repellency of the copolymer in cured state, it is suitable to select the surface modifier from acrylate or methacrylate base fluorine-containing copolymers, styrene base fluroine-containing copolymers and fluoropolyether copolymers, and it is preferred to select a fluorine-containing copolymer having hydroxyl group or carboxyl group as a functional group useful for curing. Fluorine-containing surface modifiers suitable for use in this invention are on the market. Examples are MODIPER F100 and MODIPER F200 of Nippon Oil & Fats Co., which are block copolymers having a functional segment containing a fluorinated alkyl component and having hydroxyl group in the polymer chain, FA-100, FM-100 and FS-100 of Mitsubishi Yuka Co., which are block copolymers having a acrylate base (FA-100), methacrylate base (FM-100) or styrene base (FS-100) segment and a fluorine-containing functional segment, and FOMBLIN Z DOL and FOMBLIN Z DOL TX of Nippon Montedison Co., which are perfluoropolyethers having hydroxyl group as a functional group.

To incorporate a fluorine-containing surface modifier into a copolymer according to the invention, the surface modifier is added to the mixture of monomers to be copolymerized by a method described hereinafter. In the copolymer the maximum amount of the fluorine-containing surface modifier is limited to 30 wt % of the basic copolymer formed of the copolymerized monomers, because if a larger amount of surface modifier is contained the copolymer becomes inferior in compatibility with organic solvents or pigments. Preferably the amount of the surface modifier is limited within the range from 0.5 to 10 wt % of the aforementioned basic copolymer.

A copolymer according to the invention is prepared by single-stage copolymerization of the essential monomers, and the optional monomer(s) if used. As to the purity of each monomer, gas chromatography purity of 98% or above is sufficient on condition that impurities obstructive to usual radical polymerization reactions are not contained. It is suitable to accomplish the copolymerization by a solution polymerization method using an organic solvent and an oil-soluble radical polymerization initiator.

The copolymerization reaction is carried out at a temperature ranging from $-30°$ C. to $130°$ C. An optimum temperature for the reaction depends on the kind of the initiator, but usually it is suitable to carry out the reaction at a temperature in the range from $0°$ to $100°$ C. Useful oil-soluble initiators include organic peroxides such as diisopropyl peroxydicarbonate, di-n-propyl peroxydicarbonate, t-butyl peroxypivalate, di-2-ethylhexyl peroxydicarbonate, benzoyl peroxide, lauroyl peroxide, propionyl peroxide, trichloroactyl peroxide, perfluorobutyryl peroxide and perfluorooctanoyl peroxide, azo compounds such as azobisiosbutyronitrile and azobis-2,4-dimethylvaleronitrile and organic boron compounds such as oxytriethylboron and peroxytriethylboron.

Copolymers according to the invention are well soluble even in aromatic solvents represented by xylene and toluene which are low in polarity and suitable for paint compositions. The copolymers are well soluble also in other various organic solvents including benzene, cyclic ethers such as dioxane and tetrahydrofuran, esters such as ethyl acetate and butyl acetate, ketones such as acetone, methylethyl ketone and cyclohexane, nitrogen-containing solvents such as dimethylformamide, dimethylacetamide and pyridine and halogencontaining solvents such as 1,1,1-trichloroethane and trichloroethylene. It is free to use a mixture of xylene or toluene with an organic solvent of a different category. In any case a clear and colorless copolymer solution is obtained.

A copolymer according to the invention has active hydrogen in the molecular chain and, hence, can be cured by reaction with a compound having a functional group that reacts with active hydrogen. When a coating liquid is prepared by adding a polyisocyanate to a solution of the copolymer in an organic solvent and the solvent is dissipated after applying the coating liquid to a desired surface, curing reaction of the copolymer with the polyisocyanate proceeds at room temperature. When a blocked polyisocyanate is used the curing reaction is accomplished by heat treatment at a temperature above the dissociation temperature of the polyisocyanate. In either case a well cured hard coating film is obtained. The curing agent is not limited to polyisocyanate. It is also possible to use melamine resin, urea resin or a polybasic acid or its anhydride, though heating is needed for accomplishment of curing reaction.

A paint composition is obtained by dispersing a pigment in a solution of a copolymer according to the invention and a curing agent in an organic solvent. Either an inorganic pigment or an organic pigment can be used, though in the case of using an organic pigment it is preferable to use a carboxyl-containing monomer in preparing the copolymer. The pigment exhibits good dispersibility in the solution. Besides a pigment, optional additives such as, for example, an ultraviolet absorbing agent and a dispersion stabilizing agent may be added to the solution. Such optional additives too exhibit good dispersibility in the solution.

The following are nonlimitative examples of the present invention.

EXAMPLE 1

A 1-liter stainless steel autoclave provided with an electromagnetic stirrer was charged with 54.4 g of ethylene glycol monoallyl ether (EGMAE), 1.8 g of vinylacetic acid (VAA), 7.3 g of a commercial radical polymerization initiator (PERROYL NPP of Nippon Oil & Fats Co., peroxide) and 220 g of xylene. The gas atmosphere in the autoclave was replaced by nitrogen gas, and this operation was repeated twice. After that 252.7 g of chlorotrifluoroethylne (CTFE) and 57.9 g of propylene (Pr) were introduced into the autoclave. Then the temperature in the autoclave was gradually raised up to $40°$ C., and at at this temperature polymerization reaction was carried out for 24 hr. In this case the proportions of the monomers subjected to polymerization were 52.9 mol % CTFE, 33.6 mol % Pr, 13.0 mol % EGMAE and 0.5 mol % VAA. After the reaction unreacted CTFE and Pr were discharged from the autoclave, and the reaction liquid was taken out of the autoclave. The reaction liquid was filtered to obtain a colorless and clear solution of a polymer, which was a CTFE/Pr/EGMAE/VAA copolymer. The concentration of the copolymer in the solution was 50.0 wt %.

A portion of the solution was poured into n-hexane to precipitate the copolymer. The precipitated copolymer was dried and subjected to analysis of chemical composition, molecular weight (number average molecular weight determined by GPC, assuming to be polystyrene), glass transition temperature, $T_g$ (determined from dynamic viscoelasticity measured by the TBA method) and OH value (determined by acetylation method using acetic anhydride). The analytical results are shown in Table 1.

In the following examples the copolymerization process of Example 1 was repeated with modifications only in the noted points. In every example a colorless and clear solution of a copolymer was obtained. The obtained copolymers were analyzed by the same methods. The results are shown in Table 1.

EXAMPLE 2

In place of Pr 38.6 g of ethylene (Et) was used, and the solvent was changed to 209 g of butyl acetate. The proportions of the monomers were 52.9 mol % CTFE, 33.6 mol % Et, 13.0 mol % EGMAE and 0.5 mol % VAA. In the obtained solution the cocentration of the copolymer was 47.8 wt %.

EXAMPLE 3

In place of Pr 77.1 g of iso-butene (Bu) was used, and the solvent was changed to 232 g of butyl acetate. The proportions of the monomers were 52.9 mol % CTFE, 33.6 mol % Bu, 13.0 mol % EGMAE and 0.5 mol % VAA. In the obtained solution the concentration of the copolymer was 36.5 wt %.

EXAMPLE 4

The quantity of CTFE was increased to 286.6 g (60.0 mol %), and the quantity of Pr was decreased to 45.6 g (26.5 mol %), and the quantity of xylene was slightly increased to 233 g. In the obtained solution the concentration of the copolymer was 50.4 wt %.

EXAMPLE 5

The quantity of CTFE was decreased to 238.8 g (50.0 mol %), and the quantity of Pr was increased to 68.9 g (40.0 mol %). The quantiyu of EGMAE was decreased to 41.8 g (10.0 mol %), and VAA was omitted. The quantity of xylene was slightly decreased to 210 g. In the obtained solution the concentration of the copolymer was 40.3 wt %.

EXAMPLE 6

In place of EGMAE 30.9 g of allyl alcohol (AAL) was used, and the quantity of xylene was slightly decreased to 206 g. The proportions of the monomers were 52.9 mol % CTFE, 33.6 mol % Pr, 13.0 mol % AAL and 0.5 mol % VAA. In the obtained solution the concentration of the copolymer was 41.1 wt %.

EXAMPLE 7

In place of CTFE 217 .g of tetrafluoroethylene (TFE) was used, and in place of Pr 38.6 g of Et was used. The solvent was changed to 187 g of butyl acetate. The proportions of the monomers were 52.9 mol % TFE, 33.6 mol % Et, 13.0 mol % EGMAE and 0.5 mol % VAA. In the obtained solution the concentration of the copolymer was 46.3 wt %.

COMPARATIVE EXAMPLE 1

By substantially the same process as in Example 1, 252.7 g of CTFE (52.9 mol %), 57.9 g of Pr (33.6 mol %), 61.9 g of hydroxybutylvinyl ether (HBVE) (13.0 mol %) and 1.8 g of VAA (0.5 mol %) were copolymerized in 225 g of xylene. The copolymer was low in solubility in xylene so that the reaction liquid turned into a gel. That is. in this case it was difficult to accomplish single-stage copolymerization of the four monomers including hydroxyl-containing allyl ether (HVBE) and a carboxylic acid (VAA).

COMPARATIVE EXAMPLE 2

The copolymerization of Comparative Example 1 was repeated except that the solvent was changed to 225 g of butyl acetate and that 6.3 g of $K_2CO_3$ was added as an acid acceptor. In this case a copolymer was obtained as a colorless and clear solution. The concentration of the copolymer in the solution was 52.3 wt %. Analysis of the copolymer gave the results shown in Table 1.

EVALUATION TEST 1

The copolymer solutions obtained in Examples 1, 2 and 6 and Comparative Example 2 were tested. The concentration of each solution was adjusted to 50 wt %. To test compatibilities (mutual solubilities) of these copolymer solutions with curing agents, each solution was mixed alternately with several kinds of commercial curing agents, viz., modified melamine resins (UVAN of Mitsui Toatsu Chemicals Co. and NIKALAC of Sanwa Chemicals Co.) and polyisocyanates (CORONATE of Nippon Polyurethane Co.). In every case the proportion of the curing agent was such that 30 parts by weight of the solid component of the curing agent was added to 100 parts by weight of the copolymer in the solution. After well mixing the mixed liquid was dropped onto a glass plate. The wetted glass plate was left standing at room temperature for about 24 hr and then baked at 140° C. for 30 min to cure the coating film. Every coating film was observed by the naked eye to judge the degree of cloudiness. The results are shown in Table 2, wherein "A" means a wholly transparent film, "B" a transparent but slightly cloudy film, "C" rather a cloudy film, and "D" a cloudy and opaque film.

TABLE 2

| Curing Agent | Ex. 1 | Ex. 2 | Ex. 5 | Ex. 6 | Comp. Ex. 2 |
|---|---|---|---|---|---|
| Modified Melamine Resins | | | | | |
| UVAN 20SE-60 | A | A | A | A | B |
| UVAN 20HS | A | A | A | A | B |
| UVAN 166-60 | A | A | A | A | B |
| NIKALAC MW-30 | A | A | A | A | A |
| NIKALAC MX-40 | A | A | A | A | A |
| NIKALAC MS-001 | C | A | C | A | D |
| NIKALAC MX-750 | B | B | B | A | C |
| NIKALAC MS-11 | A | A | A | A | B |
| NIKALAC MW-22A | A | A | A | A | A |
| Polyisocyanates | | | | | |
| CORONATE EH | A | A | A | A | A |
| CORONATE 2507 | A | A | A | A | A |
| CORONATE 2515 | A | A | A | A | A |

The test results in Table 2 indicate that in the case of the copolymer of Comparative Example 2 using an alkylvinyl ether it is necessary to carefully selecting a curing agent. Besides, as can be seen in Table 1 this copolymer is liable to have a relatively high molecular

TABLE 1

| | Ex. 1 | Ex. 2 | Ex. 3 | Ex. 4 | Ex. 5 | Ex. 6 | Ex. 7 | Comp. Ex. 2 |
|---|---|---|---|---|---|---|---|---|
| Composition of Copolymer (mol %) | | | | | | | | |
| CTFE | 40.5 | 42.0 | 40.3 | 42.3 | 40.1 | 41.0 | | 40.0 |
| TFE | | | | | | | 43.1 | |
| Pr | 46.9 | | | 44.3 | 49.5 | 44.9 | 44.3 | 47.0 |
| Et | | 45.3 | | | | | | |
| Bu | | | 47.2 | | | | | |
| EGMAE | 11.9 | 12.1 | 11.9 | 12.8 | 10.4 | | 12.0 | |
| AAL | | | | | | 13.5 | | |
| HBVE | | | | | | | | 13.0 |
| VAA | 0.6 | 0.6 | 0.6 | 0.6 | — | 0.6 | 0.6 | 0 |
| Content of Fluorine (wt %) | 28.9 | 32.2 | 26.7 | 30.0 | 29.3 | 31.1 | 48.0 | 28.0 |
| Molecular Weight, $M_n$ | 4600 | 3700 | 3500 | 3500 | 4000 | 3300 | 4000 | 7200 |
| OH Value (mg KOH/g) | 88 | 96 | 82 | 93 | 75 | 105 | 103 | 90 |
| Acid Value (mg KOH/g) | 4 | 5 | 4 | 4 | — | 4 | 4 | 0 | weight, which adversely affects the surface smoothness of a coating film formed of the copolymer.

EVALUATION TEST 2

Using each of the copolymer solutions obtained in Examples 1 to 7, a paint composition was prepared by first adjusting the concentration of the compolymer in the solution to 50 wt %, then adding 25 parts by weight of a white pigment (titanium oxide) to 100 parts by weight of the solution and making thorough mixing in a ball mill and finally adding a curing agent of polyisocyanate type (CORONATE EH) in an amount equivalent to the OH value of the copolymer in the mixture.

The obtained paint compositions were each diluted with xylene or butyl acetate to adjust the viscosity to a predetermined value. Then each paint composition was applied to a chromate-treated aluminum plate with an applicator, and after drying the paint film was cured by baking at 80° C. for about 1 hr. The thickness of the cured paint film was 30–35 μm. The cured paint film was left standing at room temperature for 2 days and then subjected to measurement of gloss, hardness, tightness of adhesion to the aluminum surface, Ericsen value, pliability, impact resistance, angle of contact with water and weatherability. The results are shown in Table 3.

Besides, chemical resistance of the paint films of Examples 1–7 was examined by leaving samples immersed in 5% aqueous solution of $H_2SO_4$ for 7 days at room temperature and leaving separate samples immersed in 5% aqueous solution of NaOH for 7 days at room temperature. After the immersion in the acid or alkali solution there was no change in the appearance of the paint film sample of every example.

TABLE 3

|  | Ex. 1 | Ex. 2 | Ex. 3 | Ex. 4 | Ex. 5 | Ex. 6 | Ex. 7 |
|---|---|---|---|---|---|---|---|
| Gloss (60° specular gloss) | 85 | 83 | 83 | 87 | 85 | 81 | 80 |
| Pencil Hardness (max. hardness of pencil failed to give scratch) | H | HB | 2H | H | H | H | F |
| Cross-cut Adhesion Test (no peel areas among 100 areas tested with cellophane tape) | 100/100 | 100/100 | 100/100 | 100/100 | 100/100 | 100/100 | 100/100 |
| Ericsen Value | 6.2 | 7.3 | 5.5 | 6.0 | 6.7 | 5.3 | 7.1 |
| Pliability (min. diameter (mm) of rod on which tested film could be wound without cracking) | 2 | 2 | 2 | 2 | 2 | 2 | 2 |
| Impact Value (falling weight 500 g. ½ inch diameter) | 50 | 50 | 40 | 50 | 50 | 30 | 50 |
| Angle of Contact with Water (degree) | 80 | 81 | 78 | 81 | 80 | 80 | 84 |
| Weatherability (retained gloss (%) after accelerated testing with sunshine weathermeter for 3000 hr) | 92 | 94 | 90 | 92 | 92 | 90 | 93 |

The following examples relate to the incorporation of a fluorine-containing surface modifier in copolymers according to the invention.

EXAMPLE 8

A 1-liter stainless steel autoclave provided with an electromagnetic stirrer was charged with 39.1 g of EGMAE, 1.3 g of VAA, 5.3 g of a commercial radical polymerization initiator (PERROYL NPP), 6.4 g of a fluorine-containing surface modifier (MODIPER F100, 30% solution) and 158 g of xylene. The gas atmosphere in the autoclave was replaced by nitrogen gas, and this operation was repeated twice. After that 181.2 g of CTFE and 41.6 g of Pr were introduced into the autoclave. Then the temperature in the autoclave was gradually raised up to 40° C., and at this temperature polymerization reaction was carried out for 24 hr. After the reaction unreacted CTFE and Pr were discharged from the autoclave, and the reaction liquid was taken out of the autoclave. The reaction liquid was filtered to obtain a colorless and clear solution of a copolymer. The yield of the copolymer was calculated to be about 73%. The copolymer was analyzed by the same methods as in Example 1. The results are shown in Table 4.

In the following examples, the copolymerization of Example 8 was modified only in the noted point(s). The particulars of the obtained copolymers are shown in Table 4.

EXAMPLE 9

The quantity of EGMAE was decreased to 19.5 g, and 22.2 g of HBVE was additionally used, and the fluorine-containing surface modifier was changed to 6.9 g of FM-100 (30% solution).

EXAMPLE 10

The quantity of the surface modifier, MODIPER F100 (30% solution), was increased to 32.0 g.

EXAMPLE 11

The surface modifier was omitted.

TABLE 4

|  | Ex. 8 | Ex. 9 | Ex. 10 | Ex. 11 |
|---|---|---|---|---|
| Composition of Copolymer (mol %) |  |  |  |  |
| CTFE | 44.7 | 46.6 | 42.5 | 45.4 |
| Pr | 42.7 | 40.6 | 43.9 | 41.8 |
| EGMAE | 12.0 | 12.2* | 12.9 | 12.2 |
| VAA | 0.6 | 0.6 | 0.5 | 0.6 |
| Amount of Surface Modifier (wt %) | 1 | 1 | 5 | 0 |
| Yield of Copolymer (%) | 73 | 78 | 70 | 75 |
| Molecular Weight, $M_n$ | 4800 | 5600 | 4700 | 4600 |
| OH Value (mg KOH/g) | 86 | 84 | 89 | 87 |
| Acid Value (mg KOH/g) | 5 | 4 | 5 | 5 |

*EGMAE + HBVE

EVALUATION TEST 3

Using each of the copolymer solutions obtained in Examples 8 to 11, a clear varnish composition was prepared by first adjusting the concentration of the copolymer in the solution to 50 wt % and then adding 15 parts by weight of a curing agent of modified melamine resin type (UVAN 20SE-60) to 100 parts by weight of the copolymer solution. Besides, to the copolymer solution of Example 11 a fluorine-containing surface modifier (MODIPER F100) was added so as to amount to 5 wt % of the copolymer in the solution.

The obtained varnish compositions were each diluted with xylene to adjust the viscosity to a predetermined value. Then each varnish composition was dropped onto a transparent glass plate, and after setting at room temperature the coating film was cured by baking at 140° C. for 30 min.

The degree of transparency of each coating film was evaluated by visual observation. The results are shown in Table 5.

The varnish compositions were further diluted so as to become suitable for spray coating. Then each varnish composition was spray-coated on a silver metallic paint film coated on a chromate-treated aluminum plate, and after setting at room temperature the varnish film was cured by baking at 140° C. for 30 min. The cured varnish film was subjected to measurement of gloss, hardness, tightness of adhesion to the underlying paint film and the angle of contact with water. Furthermore, each varnish film was subjected to a weathering test with a ray-control dew panel weathermeter for 1000 hr, and the measurement of the angle of contact with water was repeated after the weathering test. The results are shown in Table 5.

TABLE 5

|  | Ex. 8 | Ex. 9 | Ex. 10 | Ex. 11 |
| --- | --- | --- | --- | --- |
| Transparency* | A | A | A | B |
| Gloss (60° specular gloss) | 85 | 85 | 83 | 85 |
| Pencil Hardness (max. hardness of pencil failed to give scratch) | H | H | HB | H |
| Cross-cut Adhesion Test (no peel areas among 100 areas tested with cellophane tape) | 100/100 | 100/100 | 100/100 | 100/100 |
| Angle of Contact with Water (degree), initially | 94 | 95 | 104 | 95 |
| Angle of Contact with Water (degree), after the weathering test | 85 | 88 | 91 | 75 |

*"A" means excellent, "B" means good.

What is claimed is:

1. A curable copolymer comprising:
   25 to 75 mol % of first repeating units which originate from a fluoroolefin;
   10 to 70 mol % of second repeating units which originate from an alkene;
   3 to 40 mol % of third repeating units which originate from a hydroxyl-containing allyl ether represented by the general formula $CH_2=CHCH_2O\text{-}(CH_2CRHO)_n\text{-}H$, wherein R is H or $CH_3$ and n is 0 or an integer from 1 to 6; and
   0.5 to 20 mol % of fourth repeating units which originate from a carboxyl-containing monomer.

2. A copolymer according to claim 1, wherein said first, second, third and fourth repeating units amount to 30-60 mol %, 20-50 mol %, 5-30 mol % and 0.5-10 mol %, respectively.

3. A copolymer according to claim 1, wherein said fluoroolefin is selected from the group consisting of chlorotrifluoroethylene, tetrafluoroethylene, trifluoroethylene, hexafluoropropene, vinyl fluoride and vinylidene fluoride.

4. A copolymer according to claim 1, wherein said alkene is selected from the group consisting of ethylene, propylene, n-butene, iso-butene, n-hexene, iso-octene, 1-octene and vinylcyclohexane.

5. A copolymer according to claim 1, wherein said hydroxyl-containing allyl ether is selected from the group consisting of allyl alcohol, ethylene glycol monoallyl ether, diethylene glycol monoallyl ether, triethylene glycol monoallyl ether and hydroxypropylallyl ether.

6. A copolymer according to claim 1, wherein said carboxyl-containing monomer is selected from the group consisting of acrylic acid, methacrylic acid, vinylacetic acid, allylacetic acid, allyloxyacetic acid and itaconic acid.

7. A copolymer according to claim 1, further comprising not more than 10 mol % of auxiliary repeating units which originate from at least one monomer selected from the group consisting of acrylates, methacrylates, acrylic amides and hydroxyl-containing vinyl ethers.

8. A copolymer according to claim 1, further comprising a fluorine-containing surface modifier which is a polymeric substance and serves the function of enhancing water repellency of the copolymer in cured state, the amount of said surface modifier being not more than 30 wt % of the basic part of the copolymer formed of the copolymerized monomers.

9. A copolymer according to claim 8, wherein the amount of said fluorine-containing surface modifier is 0.5 to 10 wt % of said basic part of the copolymer.

* * * * *